United States Patent [19]
Lewis et al.

[11] 3,856,105
[45] Dec. 24, 1974

[54] VEHICLE BRAKE SYSTEM HAVING FOOT PEDAL OPERATED BRAKE ACTUATOR WITH ELECTRONIC RANGE CONTROL

[76] Inventors: Richard L. Lewis; George B. Hickner, both of 401 N. Bendix Dr., South Bend, Ind. 46628

[22] Filed: Nov. 7, 1973

[21] Appl. No.: 413,484

Related U.S. Application Data

[63] Continuation-in-part of Ser. No. 293,301, Sept. 25, 1972, abandoned.

[52] U.S. Cl. .................................. 180/98, 303/6 C
[51] Int. Cl. ............................................. B60k 27/00
[58] Field of Search .............. 180/82, 98, 105, 109; 303/6 C, 21

[56] References Cited
UNITED STATES PATENTS

| | | | |
|---|---|---|---|
| 3,370,166 | 2/1968 | Da Rold et al. | 180/98 X |
| 3,448,822 | 6/1969 | Lone et al. | 180/98 |
| 3,650,573 | 3/1972 | Inada et al. | 303/6 C X |
| 3,669,403 | 6/1972 | Slavin et al. | 303/6 C X |

*Primary Examiner*—Lloyd L. King
*Assistant Examiner*—Michael Mar
*Attorney, Agent, or Firm*—Leo H. McCormick, Jr.; William N. Antonis

[57] ABSTRACT

An automotive vehicle brake system including a fluid motor brake actuator with a movable wall therein dividing the actuator into opposed chambers and foot pedal operated valve means for controlling the pressures in the respective chambers to establish a pressure differential across the movable wall in the brake applied position of the pedal. Electrical means in the system including an obstacle detecting device which senses range and range rate of an obstacle in front of the vehicle and generates signals representative of the distance to the obstacle as well as the relative velocity of the obstacle and vehicle. The generated signals are processed and applied to comparators, the outputs of which are fed into independent AND gates having their outputs connected to solenoid valves operatively connected to the brake actuator to regulate the differential fluid pressure in the opposed chambers so that the vehicle brakes are automatically applied independently of the foot pedal operated valve means. The AND gates control energization of the solenoid valve in a manner determined by the relationship of the range and range-rate signals to brake pressure signal.

10 Claims, 1 Drawing Figure

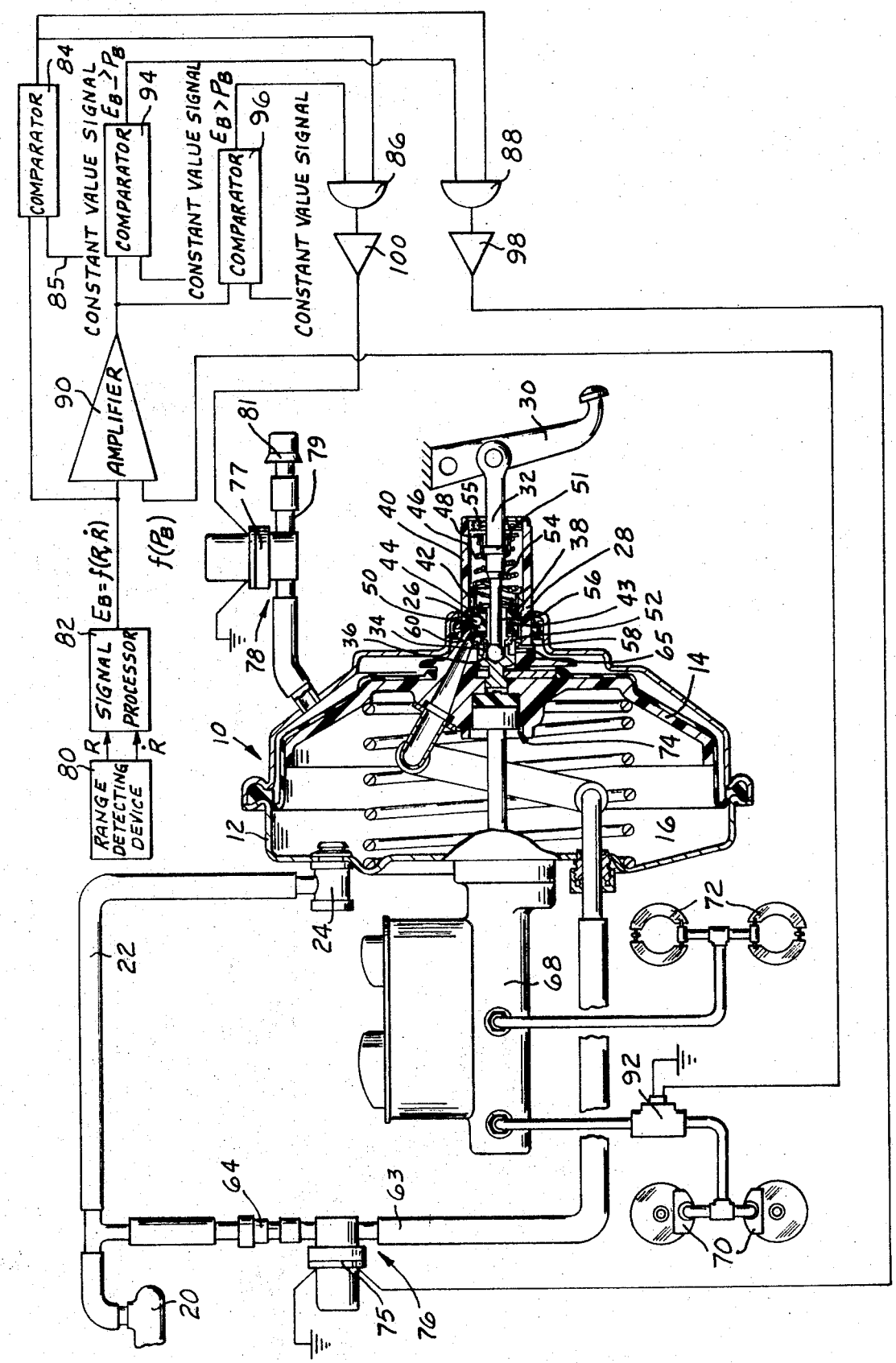

VEHICLE BRAKE SYSTEM HAVING FOOT PEDAL OPERATED BRAKE ACTUATOR WITH ELECTRONIC RANGE CONTROL

This is a continuation of application Ser. No. 293,301, filed Sept. 25, 1972 now abandoned.

BACKGROUND OF THE INVENTION

The invention relates to a vehicle brake system in which a foot pedal operated fluid brake actuator is controlled automatically by electrical means responsive to a signal representative of the range of an obstacle appearing in front of the vehicle. In anticipation of Federal legislation and in view of public awareness of vehicle safety, there have been many types of adaptive speed control and braking systems introduced, both hydraulic and pneumatic, wherein application of the brakes is controlled by electrical signals which are representative of some vehicle parameter, such as the relative speeds of the vehicle's rear wheels for example. Upon sensing a signal, the brakes are applied or released through a brake pressure modulator forming a separate and distinct component from the brake booster, as shown in U.S. Pat. No. 3,677,608, assigned to the assignee of the present invention. Another such braking system is disclosed in U.S. Pat. No. 3,669,403, assigned to the assignee of this invention and utilizes a plurality of power operated modulators for controlling the vehicle brake wheel cylinder pressures during braking. Also automotive speed control systems, as disclosed in U.S. Pat. No. 3,455,411, assigned to the common assignee of the invention, have been proposed wherein electrical signals representative of such parameters respectively, as actual vehicle speed, command vehicle speed, and throttle position are combined to develop an error signal which is applied in such a way as to position the throttle so that actual vehicle speed is equal to command speed. As can be seen from a review of the above issued patents, such systems require additional power equipment such, for example, as separate pressure modulator, thus increasing the cost and complexity of the system. The invention proposed herein may be incorporated into anyone of the above systems or into a conventional power brake system as still another safety feature without appreciably increasing the total cost of the system.

SUMMARY OF THE INVENTION

A fluid pressure brake actuator for a vehicle having foot pedal operated valve means for controlling the pressure within the actuator during manual braking and an electrical system including fluid pressure control means connected to the actuator and an obstacle detecting device which generates a signal representative of the range of the obstacle for energizing the control means to regulate the fluid pressure within the actuator so that vehicle braking is automatic.

A vehicle braking system, including a fluid pressure motor, having a housing with a movable wall therein dividing the housing into opposed chambers and foot pedal operated valve means for controlling the differential pressures in the opposed chambers to thereby apply the brakes manually, and further including an electrical system having solenoid valves operatively connected to the fluid motor and actuated by signals representative of the range and relative velocity of an obstacle in front of the vehicle for controlling the differential pressure in the opposed chambers independently of said foot pedal.

A fluid pressure brake servomotor actuated manually by foot pedal operated valve means and automatically by auxiliary electrical means including fluid pressure control means associated with the servomotor and responsive to signals which are a function of the range of an obstacle a predetermined distance in front of the vehicle.

A vehicle brake systemm including a fluid pressure motor controlled by foot pedal operated valve means and by electrical means which responds to a signal from a radar device.

BRIEF DESCRIPTION OF THE DRAWINGS

The FIGURE is a functional block diagram embodying the elements of the invention including a cross sectional view of a fluid pressure brake servomotor which is controlled manually or automatically.

DETAILED DESCRIPTION

Referring to the FIGURE reference numeral 10 designates a fluid pressure actuated brake servomotor having a housing 12 in which a movable wall or power piston 14 is carried for axial movement within the housing. The movable wall 14 divides the housing 12 into opposed chambers 16 and 18 and is urged to the right in the figure by return spring 19 under non-braking conditions. The chamber 16 is continuously in communication with a low pressure source such as engine manifold 20, through pipe line 22 and fitting 24 secured to the housing 12. Valve means 26 located in hub portion 28 of the movable wall 14, controls the fluid pressure in the chamber 18 as determined by the applied or released position of foot pedal 30 operatively connected to the valve means by valve operating rod 32 the inner end of which is carried in a socket 34 of a valve plunger 36. A poppet valve assembly 38 is located in hub extension 40 so that annular flange 42 of poppet member 43 engages abutment 44 of the hub extension. A valve return spring 46, interposed between the flange 42 and a spring retainer member 48 carried by the rod 32 holds the rod 32 and plunger 36 to the right in the released pedal position, as shown. The spring 46 also holds the flange 42 against the abutment 44. The forward end of the poppet member 43 is formed with a seating ring 50 which seats on end 52 of the valve plunger 36. A spring 54 is interposed between the rear section of the seating ring 50 and an abutment 51 of the operating rod 32 to thereby urge the ring 50 into sealing engagement with the end 52 of the valve plunger 36 so that atmospheric pressure entering at the open end 55 of the hub extension 40 through passage 56 of the poppet member 43 is precluded from the chamber 18, with the brake pedal in released position, as shown. The seating ring 50 is dimensioned radially so that it also sealingly engages a valve seat 58 located at the inner end of the hub extension 40 to control vacuum 60 which communicates with the vacuum passage 62 in the movable wall 14. A vacuum line 63 communicates the passage 62 to engine manifold 20 through a vacuum check valve 64. A control passage 65 in the hub extension 40 of the movable wall communicates the opposed chamber 18 with the vacuum connection 62 or atmosphere via the passage 56. The valve plunger 36 is drivably connected to a push rod 66, the latter of which is operatively connected to a split system hydraulic master cylinder 68 having fluid connections to front and rear brakes 70 and 72 respectively. Disc reaction means 74, located in the lower piston 14, is interposed between the plunger 36 and the push rod 66 to establish operator "feel" in the pedal 30 during a brake application. In the brake pedal released condition the brake servomotor parts are as shown in the figure. Upon brake application, the operating rod 32 is moved to the left in the drawing, seating ring 50 on valve seat 58 and unseating the seating ring 50 from the end 52 of the valve plunger 36 so that the control passage 65 is now cut off from the vacuum connection 62 and communicated with atmosphere through the passage 56. The servomotor 10 is of the vacuum suspended type but it is understood that other forms of servomotors, pneumatic or hydraulic, are equally applicable. The description thus far relates to the general arrangement of parts of one type of brake servomotor of the prior art. A more detail explanation of the construction and operation may be had from an examination of U.S. Patent 3,110,031, assigned to the common assignee of this invention and incorporated herein by reference.

In addition to being controlled conventionally by the foot pedal operated valve means 26, the fluid motor 10 as modified in accordance with the invention, is also controlled automatically by auxiliary electrical means including fluid pressure control means 76 and 78, for regulating differential pressures across the movable wall 14. The fluid pressure control means 76 and 78 includes respectively independent solenoid valves 75 and 77 forming components of an electrical system which further includes a radar device 80 for detecting an obstacle such, for example, as another vehicle within a predetermined range in front of the vehicle on which the system is mounted. More specifically, the solenoid valve 75 which is normally open communicates the chamber 18 with manifold vacuum through line 63 and the solenoid 77 which is normally closed precludes atmosphere from entering the chamber 18 via conduit 79 and air filter 81. However, upon energization of valves 75 and 77, the vacuum valve 75 closes and the atmospheric valve 77 opens. The obstacle detecting device 80 determines the range and range-rate between a vehicle on which the device is mounted and an obstacle or target in front of the vehicle and generates signals representative of the range and range-rate of the target. The system employed utilizes microwave energy which not only has the capability of being transmitted and received but the advantage of simplicity of generation and detection. Since both range R and range-rate R information are needed, a Doppler type radar system suggests a convenient expedient to obtaining this information. The Doppler radar system is more specifically a Gunn diode Doppler radar where a variable voltage is applied to the Gunn diode so that two discreet frequencies are transmitted on a time-sharing basis. The reflected energy from the target creates two Doppler frequencies which form a composite signal. The phase relationship of the two Doppler frequencies is representative of the range between the radar system and the target or obstacle and the Doppler frequency per se is representative of or directly related to the relative velocity between the radar system transmitting antenna and the target or obstacle from which the energy received is reflected. For a complete description of the Doppler system which forms a part of this invention see U.S. Pat. No. 3,659,293, assigned to the common assignee of this application and incorporated herein by reference.

The radar system of the device 80 extracts the range and range-rate data from the reflected signals received from the target. This data comprising signals representative of the range R and range-rate R of the target are fed into a signal processor 82 which generates a signal $E_B$ that is a function of the range R and range-rate R between the vehicle being braked and a target or obstacle in the vehicle's path. The signal $E_B$ is fed into first comparator 84 which also receives an initiating constant voltage signal on lead 85 which represents an undesired braking condition of the vehicle with respect to its relationship of range and range-rate to the target. If the signal $E_B$ is greater than the predetermined initiating signal of constant value appearing on lead 85 the comparator will change state. The output of the comparator 84 is fed into AND gates 86 and 88.

The signal $E_B$ from the signal processor 82 also serves as one input to an amplifier 90. The amplifier 90 receives a second electrical signal input from pressure transducer 92. The input signal voltage generated by the transducer 92 and designated by the symbol $P_B$ is a function of brake pressure developed by the master cylinder 68. It is understood that this brake pressure may be sensed at any desired location within the brake system. The output from amplifier 90 is connected to second and third comparators 94 and 96, respectively. The comparator 94 is supplied with a constant value input or bias which prevents undesirable fluctuations or hunting of the solenoid valve 75 to which it is connected when the voltage signal produced by $P_B$ is equal to $E_B$. The output of the second comparator 94 is fed into the AND gate circuit 88 which, as aforementioned, is also connected to the output of the first comparator 84. The output from AND gate 88 is run through power amplifier 98 which drives the normally open vacuum valve 75 toward a closing position upon energization. The third comparator 96 is also biased with a constant value input voltage signal which prevents undesriable fluctuations undesirable hunting of the solenoid valve 77 with which the comparator is connected when the voltage signal representative of $P_B$ is equal to $E_B$. The output of the third comparator 96 is fed into the AND gate circuit 86, the latter of which is also connected to the output of the first comparator 84. The AND gate 86 output is run through power amplifier 100 which drives the normally closed air valve 77 toward an opening position upon energization.

The comparator 94 is set so that it has no output when $E_B$ is less then $P_B$. This, of course, inhibits AND gate 88 from generating an output of its own. However, when $E_B$ is equal to or greater than $P_B$ the comparator 94 has an output which is fed to AND gate 88. Since AND gate 88 is now activated by $E_B$ output of comparators 84 and 94, the AND gate 88 generates its own output signal whic is connected to the vacuum solenoid valve 75 through driver amplifier 98 to thereby energize the normally open valve, causing it to close. The comparator 96 is set so that it has no output when $P_B$ is greater than $E_B$, thus preventing activation of the AND gate 86 to which the air valve 77 is connected. Upon $E_B$ becoming greater than $P_B$ the comparator 96 develops a signal which is fed to AND gate 86 to activate it. The AND gate 86 now generates a signal which is fed to the power amplifier 100 and normally closed air valve 77 to energize the valve into open position.

The table below shows the state of the solenoid valves 75 and 77 at predetermined signal levels depending on brake pressure build, decay or hold, as follows:

| Condition | Air Valve | Vacuum Valve | Brake Pressure |
|---|---|---|---|
| EB < initiating value | Closed | Open | 0 |
| EB > PB and > initiating value | Open | Closed | Rising |
| EB = PB | Closed | Closed | Hold |
| EB < PB and > initiating value | Closed | Open | Decreasing |

MODE OF OPERATION

The braking system of this invention includes the modified conventional brake pedal operated fluid pressure servomotor 10 to which the master cylinder 68 is operatively connected. Under normal driving conditions, and in the absence of a signal $E_B$ indicating an obstacle in front of the vehicle, highway braking is accomplished in the customary manner by depressing pedal 30 which controls the valve means 26 for regulating the intensity of the pressure differential appearing across the movable wall 14. However, the fluid pressure servomotor 10 is also controlled independently of the foot pedal operated valve means under certain conditions of vehicle operation for regulating the differential pressure across the movable wall. Assuming a condition in which the signal $E_B$ is less than the value of the initiating signal appearing on the lead 85 to comparator 84, the output of the comparator is such that the solenoid valves 75 and 77 will not be energized and the brake pressure will be zero. If the signal $E_B$ should rise, in response to the appearance of an obstacle within the maximum preselected range, so that EB is greater than the PB signal and the initiating signal applied to lead 85 of the comparator 84, both solenoid valves 75 and 77 will become energized, closing vacuum valve 75 and opening air valve 77. This establishes a pressure differential across the movable wall 14 which drives master cylinder push rod 66 to thereby cause the brake pressure $P_B$ to rise. The magnitude of this brake pressure is picked up by the transducer 92 which generates a signal representative of the brake pressure and feeds the resultant signal into the amplifier 90. The valve 75 will now remain closed and the valve 77 will remain open so that the brake pressure $P_B$ will further increase until the magnitude of the signal developed by $P_B$ is equal to the signal representative of $E_B$, at which time the air valve 77 is closed, since it is now deenergized, and valve 75 is closed since it remains energized. This action of the valves 75 and 77 holds the brake pressure at a given level until the signal $E_B$ increases or decreases. Should the signal $E_B$ become less than the signal representative of $P_B$ but still be greater than the initial signal on lead 85, the air valve 77 remains closed and the vacuum valve 75 opens, communicating the opposed chamber 18 to engine manifold to thereby reduce the pressure in this chamber. This action causes a reduction in brake pressure. Of course, any increase or decrease in $E_B$ with respect to either the signal representative of $P_B$ or the signal representative of the initiating constant applied to lead 85 will cause the valves 75 and 77 to open and close intermittently in order to modulate the brake pressure as required.

We claim:

1. In an automotive vehicle brake system having a fluid pressure actuated motor including a housing with a movable wall therein dividing dividing the housing into opposed chambers and foot pedal operated valve means having a released position in which the fluid pressures in the opposed chambers are substantially the same and an applied position in which the fluid pressure in one of the chambers is greater than that of the other chamber so that the movable wall connected to a brake actuating means creates a braking force through the brake actuating means which is applied to the vehicle brakes, the improvement which comprises:
   an electrical system including fluid pressure control means having an independent valve means connecting a low pressure fluid source and a relatively higher fluid pressure source to the fluid motor and an obstacle detecting device therein which generates a signal representative of the range of an obstacle for energizing the control means to regulate the fluid pressure in the one chamber with respect to that in the other chamber upon detecting an obstacle within a predetermined range in front of the vehicle so that the vehicle brakes are automatically applied independently of the released position of the foot pedal operated valve means.

2. The improvement in claim 1 wherein said independent valve means includes two solenoid valves, one of which is normally open and is connected between said one chamber and the low pressure source and the other of which is normally closed and is connected between said one chamber and the higher pressure source so that the pressure level in said one chamber can be regulated as aforesaid upon energization of said valves.

3. The improvement in claim 2 wherein said one solenoid valve is connected to vacuum for the low pressure source and said other solenoid valve is connected to atmosphere for the higher pressure source.

4. The improvement in claim 3 wherein the vacuum source is connected to said one chamber via said pedal operated valve means so that in the released position of the valve means said one chamber communicates with vacuum and in the applied position of the valve means said one chamber is cut-off from vacuum.

5. The improvement in claim 1 wherein said obstacle detecting device generates signals representative of the relative velocity and range of the obstacle with respect to the vehicle for regulating the fluid pressure in the one chamber with respect to that in the other chamber upon detecting an obstacle within a given range in front of the vehicle, the range to which obstacle is closing at a given rate so that the vehicle brakes are automatically applied.

6. In an automotive vehicle brake system having a fluid pressure servomotor including a housing with a movable wall therein dividing the housing into opposed chambers, foot pedal operated valve means in the housing for controlling differential pressures in the opposed chambers and having a released position in which the opposed chambers are connected to vacuum and an applied position in which one of the chambers is connected to atmosphere so that a differential pressure is developed in the opposed chambers to drive the movable wall, and a hydraulic master cylinder operatively connected to the movable wall and to the vehicle brakes, the improvement which comprises:

auxiliary means responsive to the detection of an obstacle in front of the vehicle for establishing a differential pressure in the opposed chambers to drive the movable wall as aforesaid;

said auxiliary means including a connection from said one chamber to a source of vacuum and another connection from said one chamber to a source of atmosphere, a normally open solenoid valve located in the connection to vacuum and a normally closed solenoid valve located in the connection to atmosphere, and electrical means including an obstacle detecting device operatively connected to said solenoids for controlling the opening and closing thereof upon receiving an electrical signal representative of the relative velocity of an obstacle appearing in front of the vehicle, the range to which is diminishing at a predetermined rate.

7. The improvement of claim 6 wherein said one chamber is connected to the vacuum via the pedal operated valve means when said valve means is in its released position and the other of the opposed chambers is connected at all times to a vacuum source.

8. The improvement in claim 6 wherein said electrical means further includes a transducer for developing a signal representative of hydraulic master cylinder brake pressure which is compared with the signal representative of the relative velocity of an obstacle in front of the vehicle to establish resultant signals which are applied to the respective solenoids to achieve the desired vehicle braking.

9. The improvement in claim 8 wherein said electrical system also includes a first comparator into which the obstacle velocity signal is fed together with another signal which is representative of a preselected brake initiating condition, second and third comparators in parallel having a common input signal which is a function of the relative velocity of the obstacle sensed and independent constant input signals representative of undesired braking conditions, and a pair of AND gates having first inputs connected respectively to said second and third comparators and second inputs connected to the output of said first comparator, the outputs from the pair of AND gates are connected respectively to the solenoid valves.

10. In a vehicle brake system having a fluid pressure actuated motor including a housing with a movable wall therein dividing the housing into opposed chambers and operated valve means having a released position in which the fluid pressures in the opposed chambers are substantially the same and an applied position in which the fluid pressure in one of the chambers is greater than that of the other chamber so that the movable wall creates a braking force which is applied to the vehicle brakes, the improvement which comprises:

an electrical system including fluid pressure control means having an independent valve means connecting a low pressure fluid source and a relatively higher fluid pressure source to the fluid motor and an obstacle detecting device therein which generates a signal representative of the range of an obstacle for energizing the control means to regulate the fluid pressure in the one chamber with respect to that in the other chamber upon detecting an obstacle within a predetermined range in front of the vehicle so that the vehicle brakes are automatically applied independently of the released position of the operated valve means.

* * * * *